United States Patent
Gottlieb et al.

(10) Patent No.: US 10,714,785 B2
(45) Date of Patent: Jul. 14, 2020

(54) SYSTEMS AND METHODS FOR ELECTROLYTE STORAGE AND DETECTING FAULTS IN FLOW BATTERIES

(71) Applicant: Vionx Energy Corporation, Woburn, MA (US)

(72) Inventors: Peter Gottlieb, Wayland, MA (US); Jeffrey Modderno, Andover, MA (US); Michael Falcinelli, Boxford, MA (US); Shazad Butt, Natick, MA (US)

(73) Assignee: Vionx Energy Corporation, Woburn, MA (US)

( * ) Notice: Subject to any disclaimer, the term of this patent is extended or adjusted under 35 U.S.C. 154(b) by 28 days.

(21) Appl. No.: 15/846,009

(22) Filed: Dec. 18, 2017

(65) Prior Publication Data
US 2018/0175429 A1    Jun. 21, 2018

Related U.S. Application Data

(60) Provisional application No. 62/436,388, filed on Dec. 19, 2016, provisional application No. 62/436,365, (Continued)

(51) Int. Cl.
*H01M 10/00* (2006.01)
*H01M 10/05* (2010.01)
(Continued)

(52) U.S. Cl.
CPC ......... *H01M 10/05* (2013.01); *H01M 2/0257* (2013.01); *H01M 2/1016* (2013.01);
(Continued)

(58) Field of Classification Search
CPC ............. H01M 2/0257; H01M 8/0221; H01M 8/04746; H01M 8/188; H01M 88/2475; H01M 8/2475; Y02E 60/528
See application file for complete search history.

(56) References Cited

U.S. PATENT DOCUMENTS 8,318,099 B2 * 11/2012 Potyrailo ........... G06K 19/0717
250/214.1
2007/0172616 A1  7/2007 Ehsani et al.
(Continued)

FOREIGN PATENT DOCUMENTS

CN    102290588 A    12/2011
CN    105242211 A    1/2016
(Continued)

OTHER PUBLICATIONS

Written Opinion of the International Searching Authority and International Search Report issued in corresponding International Application No. PCT/US17/67100, dated Mar. 7, 2018, 8 pages.
(Continued)

*Primary Examiner* — Cynthia H Kelly
*Assistant Examiner* — Monique M Wills
(74) *Attorney, Agent, or Firm* — Mintz Levin Cohn Ferris Glovsky and Popeo, P.C.

(57) ABSTRACT

A flow battery system is provided that has at least one cell stack and at least a pair of storage containers or tanks connected to the at least one cell stack. Each of the storage containers is formed from a rigid (e.g., metal) shell and includes a liner directly bonded to inner walls of the rigid shell and forming an enclosure configured to retain a liquid electrolyte. The electrolyte can be an anolyte or catholyte. In the assembled configuration, the metal shell of the storage container provides secondary containment whereas the liner directly bonded thereto provides primary containment. The flow battery system includes a fault detection system configured to detect a presence of a fault or leak and further to determine a location of that leak in the flow battery system, such as a storage container or a specific portion of the storage container.

18 Claims, 9 Drawing Sheets

Related U.S. Application Data filed on Dec. 19, 2016, provisional application No. 62/436,347, filed on Dec. 19, 2016.

(51) Int. Cl.
| | |
|---|---|
| *H01M 4/13* | (2010.01) |
| *H01M 10/04* | (2006.01) |
| *H01M 2/10* | (2006.01) |
| *H01M 8/04082* | (2016.01) |
| *H01M 8/2484* | (2016.01) |
| *H01M 8/04186* | (2016.01) |
| *H01M 8/2475* | (2016.01) |
| *H01M 2/02* | (2006.01) |
| *H01M 8/0221* | (2016.01) |
| *H01M 8/18* | (2006.01) |
| *H01M 8/04746* | (2016.01) |

(52) U.S. Cl.
CPC ........... *H01M 4/13* (2013.01); *H01M 8/0221* (2013.01); *H01M 8/04186* (2013.01); *H01M 8/04201* (2013.01); *H01M 8/188* (2013.01); *H01M 8/2475* (2013.01); *H01M 8/2484* (2016.02); *H01M 10/0422* (2013.01); *H01M 8/04746* (2013.01); *Y02E 60/528* (2013.01)

(56) References Cited

U.S. PATENT DOCUMENTS

| | | | | |
|---|---|---|---|---|
| 2010/0003545 A1* | 1/2010 | Horne | ................... | B60L 53/54 429/471 |
| 2011/0081562 A1 | 4/2011 | Parakulam et al. | | |
| 2011/0244277 A1 | 10/2011 | Gordon, II et al. | | |
| 2013/0302710 A1* | 11/2013 | Boersma | ............. | H01M 8/0273 429/429 |
| 2014/0050947 A1 | 2/2014 | Donnelly | | |
| 2014/0057182 A1* | 2/2014 | DeJonghe | ............. | H01M 12/06 429/405 |
| 2014/0227628 A1 | 8/2014 | Tang et al. | | |
| 2014/0255734 A1 | 9/2014 | Tennessen et al. | | |
| 2014/0320061 A1* | 10/2014 | Daniel | ................. | H01M 8/188 320/103 |
| 2015/0162635 A1 | 6/2015 | Parakulam et al. | | |
| 2016/0204458 A1 | 7/2016 | Boersma et al. | | |
| 2017/0205308 A1* | 7/2017 | Wassarman | ............... | E04B 1/92 |

FOREIGN PATENT DOCUMENTS

| | | |
|---|---|---|
| JP | 2012-160344 A | 8/2012 |
| JP | 2014-127263 A | 7/2014 |
| WO | 2016/007555 A1 | 1/2016 |

OTHER PUBLICATIONS

Written Opinion of the International Searching Authority and International Search Report issued in corresponding International Application No. PCT/US17/67093, dated Mar. 7, 2018, 8 pages.

Written Opinion of the International Searching Authority and International Search Report issued in corresponding International Application No. PCT/US17/67088, dated Mar. 6, 2018, 8 pages.

* cited by examiner

SYSTEMS AND METHODS FOR ELECTROLYTE STORAGE AND DETECTING FAULTS IN FLOW BATTERIES

CROSS-REFERENCE TO RELATED APPLICATION

This application claims priority to U.S. Provisional App. No. 62/436,388 filed on Dec. 19, 2016, and entitled "Systems and Methods for Electrolyte Storage and Detecting Faults in Flow Batteries," and U.S. Provisional Patent Application No. 62/436,365, filed on Dec. 19, 2016, and entitled "Large Scale Flow Battery System" and U.S. Provisional Patent Application No. 62/436,347, filed on Dec. 19, 2016, and entitled "Modular and Scalable Flow Battery System." This application is also related to U.S. patent application Ser. No. 15/845,896, filed Dec. 18, 2017, entitled "Large Scale Flow Batter System" and U.S. patent application Ser. No. 15/845,849, filed Dec. 18, 2017, entitled "Modular and Scalable Flow Battery System". The entirety of each of these applications is incorporated by reference.

FIELD

A storage container for storing electrolyte in a flow battery of a power generation system, as well as methods and systems for detecting faults in the flow battery, are provided.

BACKGROUND

A typical flow battery system includes a flow battery stack, an anolyte reservoir, and a catholyte reservoir. An anolyte solution is circulated between the anolyte reservoir and the flow battery stack. A catholyte solution is circulated between the catholyte reservoir and the flow battery stack.

Flow batteries, also known as redox flow batteries, convert electrical energy into chemical energy that can be stored and later released when there is demand. A typical flow battery system is configured to store and discharge electrical energy. Such a flow battery system, for example, can convert electrical energy generated by a power source into chemical energy, which is stored within a pair of anolyte and catholyte solutions. The flow battery system can later convert the stored chemical energy back into an electrical energy form that can be transferred and used outside of the flow battery system.

Flow batteries can be used in grid-connected energy storage systems and/or in off-grid energy storage systems. For example, flow batteries can support the national grid in peak hours. In some applications, flow batteries can be used to support renewable energy systems, such as a wind-powered system or a solar-powered system. In any particular application, in general, the flow batteries have a potential to provide sustainable and reliable energy production.

SUMMARY

Various methods and devices are provided that include a storage container for a flow battery system that includes a liner member directly molded to the interior of the container. The flow battery system having the storage containers with the liner members storing electrolyte includes a fault detection system configured to accurately identify a location of a leak in the flow battery system.

In some aspects, a flow battery system is provided that includes at least one cell stack and at least a pair of storage containers connected to the at least one cell stack. Each of the storage containers has a rigid shell, and a liner member directly bonded to at least a portion of inner walls of the rigid shell and forming an enclosure configured to retain a liquid electrolyte. The flow battery system also includes a fault detection system configured to detect a fault in at least one of the storage containers.

The flow battery system can vary in many different ways. For example, the fault detection system can be further configured to detect a location of the detected fault. As another example, the fault can be in the form of at least one leak of the liquid electrolyte through the liner member. The electrolyte can be an anolyte or a catholyte.

The rigid shell can be formed from a metal. The metal can be steel, such as stainless steel or carbon steel. The metal can also be aluminum, or other suitable metal. The flow battery system can be or can include a vanadium redox flow battery.

In some embodiments, the liner member can be roto-molded to the inner walls of the rigid shell. The liner member can be formed from at least one material selected from a high-density polyethylene, a medium-density polyethylene, a low-density polyethylene, polypropylene, epoxy, vinyl ester, and glass.

In some embodiments, the fault detection system includes a plurality of sensors disposed at selected locations in the flow battery, at least one signal source configured to transmit a plurality of probe signals at a frequency range through the flow battery system, at least one detector configured to receive at least one return signal received in response to transmitting the plurality of probe signals, and at least one processor. The at least one processor configured to analyze the return signal received by the at least one detector to determine whether the return signal indicates that a leak in the flow battery system is detected, generate distance values indicating a distance to the leak from each of the plurality of sensors when the leak is detected, and determine a location of the leak in the flow battery system based on the distance values.

The fault detection system can vary in any of various ways. For example, each of the sensors can form a capacitive coupling between the sensor and the entirety of the electrolyte in the flow battery. As another example, the plurality of probe signals include radiofrequency signals. As a further example, the at least one return signal received by the detector includes complex impedance. The complex impedance includes resistance as a real part and reactance as an imaginary part. In some embodiments, a peak or dip in the reactance is indicative of the leak.

In some embodiments, the detector and the processor are included in the same device. In some embodiments, the processor is configured to provide an alert indicating an occurrence of the leak at the determined location. The alert can indicate a requirement to service the flow battery to repair the leak.

In other aspects, a method of operating a flow battery system is provided that includes causing at least one signal source to transmit a plurality of probe signals at a frequency range through the flow battery system comprising a plurality of sensors disposed at selected locations in the flow battery, receiving at least one return signal generated in response to transmitting the plurality of probe signals, analyzing the return signal to determine whether the return signal indicates that a leak in the flow battery system is detected, determining distance values indicating a distance between the leak and each of the sensors when the leak is detected, and determining a location of the leak in the flow battery system based on the distance values.

BRIEF DESCRIPTION OF THE DRAWING

The present disclosure will be more fully understood from the following detailed description taken in conjunction with the accompanying drawings, in which.

DETAILED DESCRIPTION

Figure 1A:
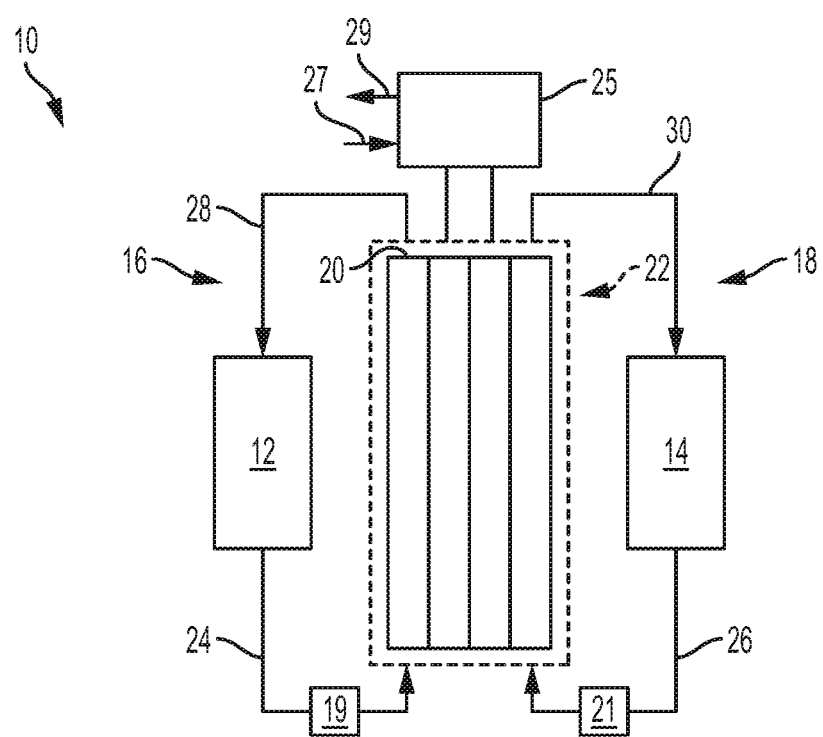
FIG. 1A is a schematic diagram illustrating an embodiment of a flow battery system.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, system and methods are provided for using lined tanks, also referred to as storage containers, in a flow battery system for a power generation system. The lined storage containers are configured to store a liquid electrolyte. Each of the storage containers is formed from a rigid (e.g., metal) outer shell and a liner member or liner directly bonded to at least a portion of inner walls of the rigid shell and forming an enclosure configured to retain the liquid electrolyte. The described techniques involve electrically isolating the electrolyte disposed within the enclosure formed by the liner from the grounded outer metal shell (tank). The flow battery system can have at least one cell stack and at least a pair of storage containers connected to the at least one cell stack.

The electrolyte can be an anolyte or a catholyte. In the assembled configuration, the metal shell of the storage container provides secondary containment whereas the liner directly bonded thereto provides primary containment. The flow battery system includes a fault detection system configured to detect a fault or leak and its location in the flow battery system, such as a storage container or a specific portion of the storage container. When a breach in the primary containment occurs, the fault detection system can detect the breach before the integrity of the secondary containment is compromised, preventing a leak to the environment.

The flow battery includes a stack container and a certain number of electrolyte storage containers. The stack container includes cell stacks and electrolyte pumps, as well as supporting plumbing, valves and control electronics components. In some embodiments, a "building block" for the flow battery includes a stack container and a pair of storage containers, each pair including an anolyte storage container and a catholyte storage container.

In some embodiments, each storage container configured to hold electrolyte includes a metal shell and a liner (also referred to herein as a "liner member"). The liner member is permanently bonded to the interior of the metal shell. The metal shell (e.g., a steel shell) acts as a "secondary containment" used for collecting electrolyte if a problem (e.g., a leak) occurs in the liner member. The secondary containment needs to be associated with systems and methods that are able to detect when there is a failure in the primary containment (the liner member), such that the secondary containment provides protection against potential electrolyte spills. Without this detection, the corrosive electrolyte may eventually penetrate through the secondary containment and electrolyte could escape without warning. Thus, the described techniques provide a way to detect when the liner member has become compromised. Specifically, the techniques allow determining which storage container among multiple storage containers has a leak. Furthermore, in some embodiments, a specific location of the leak in the storage container can be identified.

A typical flow battery includes a redox flow cell that has a negative electrode and a positive electrode separated by an electrolyte layer, which may include a separator, such as an ion-exchange membrane. A negative electrolyte (sometimes referred to as the anolyte) is delivered to the negative electrode and a positive electrolyte (sometimes referred to as the catholyte) is delivered to the positive electrode to drive electrochemically reversible redox reactions. The separator prevents the electrolytes from mixing but permits selected ions to pass through to complete the redox reactions.

FIG. 1 illustrates schematically an embodiment of a redox flow battery system 10. The flow battery system 10 includes a first electrolyte storage tank 12, a second electrolyte storage tank 14, a first electrolyte circuit loop 16, a second electrolyte circuit loop 18, a first flow regulator 19, a second flow regulator 21, one or more flow battery cells 20 arranged in a stack 22, a power converter 25, a controller 23 (not shown), energy input 27, and energy output 29. The first and second electrolyte storage tanks 12, 14 are each adapted to hold and store one of a pair of electrolyte solutions. Examples of suitable electrolyte solution pairs include vanadium and vanadium solutions, bromine and polysulfide solutions, vanadium and bromide solutions, organic metal molecular based solutions, etc. The described systems are applicable to any flow battery chemistry and are not limited to a flow battery having vanadium electrolyte solution.

During operation, the liquid electrolytes containing redox active species are circulated through the cells 20 of the stack, converting chemical energy to electrical energy for power generation. A person skilled in the art will appreciate that the redox reactions are reversible to convert electrical energy to chemical energy for energy storage. For example, the first and second electrolyte circuit loops 16 and 18 each have a source conduit 24, 26, and a return conduit 28, 30, respectively. The first and second flow regulators 19 and 21 are each adapted to selectively regulate flow of one of the electrolyte solutions through a respective one of the electrolyte circuit loops 16, 18 in response to a control signals from the controller. Each flow regulator 19, 21 can include a single device, such as a variable speed pump or an electronically actuated valve, or a plurality of such devices, depending upon the particular design requirements of the flow battery system. Embodiments of the present disclosure, however, are not limited to any particular type of a flow regulator. Other details related to a redox flow battery system are described, for example, in the U.S. Pat. No. 8,884,578, filed Feb. 7, 2011, the entire content of which is incorporated herein by reference.

Figure 1B:
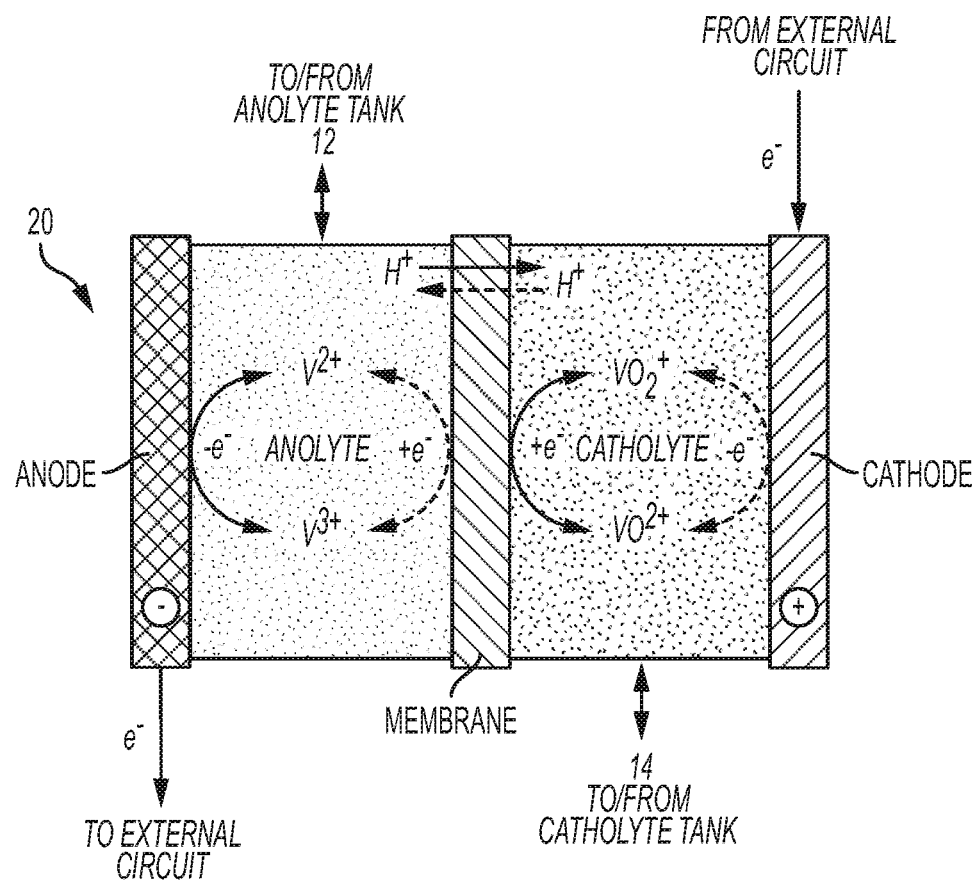
FIG. 1B is a schematic diagram illustrating an embodiment of an electrochemical cell of a battery cell stack of the flow battery of FIG. 1A.

FIG. 1B presents an embodiment of a representative battery cell 20 of the stack 22, illustrating representative redox reactions converting chemical energy of the liquid electrolytes into electrical energy. In this example, the battery cell 20 includes a porous, negative electrode (anode), a porous positive electrode (cathode), and a separator or membrane interposed there between. The porous negative node is in fluid communication with the liquid electrolyte of the tank 12 (referred to as an anolyte) and the porous positive electrode is in fluid communication with the liquid electrolyte of the tank 14 (referred to as a catholyte). The positive and negative electrodes are further in electrical communication with an external circuit.

In the examples of FIGS. 1A and 1B, the cell 20 is a vanadium-vanadium (all-vanadium) redox flow battery. It should be appreciated, however, that the battery can operate using any other electrolyte, including, for example, organic non-vanadium electrolyte.

The liquid electrolyte for vanadium redox flow batteries can be vanadium sulfate dissolved into a sulfuric acid solution. Typical concentrations of vanadium sulfate and sulfuric acid can range from 1-2 M and 4-5 M respectively. Equations 1 and 2 show the redox couples for the for the all-vanadium system, note that spectator species ($SO_4$) are not shown:

$$\text{Anolyte(-): } V^{+2} \leftrightarrow V^{+3} + e^-, U° = -0.25V \quad (1)$$

$$\text{Catholyte(+): } VO^{+2} + 2H^+ e^- \leftrightarrow VO_2^+ H_2O, U° = 1.00V \quad (2)$$

Both negative and positive half-cell reactions occur at the surface of carbon-based paper electrodes which are separated, in this example, by a PFSA (perfluorinated sulfonic acid)-based proton exchange membrane. The membrane allows protons to transfer charge between cells while minimizing crossover of vanadium. In the stack 22, the cells 20 are electrically connected in series through graphite bipolar plates which also contain flow channels for bulk electrolyte transport to and from each cell. The cells 20 are fed electrolyte in parallel through a common manifold integrated into the cell stack. It should be appreciated that the PFSA-based proton exchange membrane is shown by way of example only, as a membrane of any other type can be used, including a suitable non-fluorinated membrane.

In the example illustrated, there are three modes in which the redox flow battery 10 can operate: charge, discharge, and electrolyte maintenance. During charge (and discharge) operations, energy is supplied (or extracted) from the electrolyte by pumping reactants from the storage tanks 12, 14 to the cell stack 20 in sufficient quantities to support the electrochemistry.

During electrolyte maintenance in a vanadium-based battery, effects of vanadium crossover through the cell membrane are reversed. In general, it is found that the concentration of vanadium in the catholyte increases over time (i.e., # of cycles). Net water transport across the membrane is also responsible for changes in vanadium concentration, both of which impact the overall volume of electrolyte in each tank. Without this maintenance, energy capacity and efficiency can decrease with cycling. Vanadium precipitation is also a concern in the catholyte side if the concentration of vanadium is allowed to get too high and too hot (e.g., 2 M, >40° C.).

In some embodiments, an all-vanadium redox flow battery is used which has vanadium in both the anolyte and catholyte. However, the described techniques can be implemented for other types of batteries. For example, as mentioned above, non-vanadium electrolyte, or any other type of electrolyte can be used.

Figure 2A:
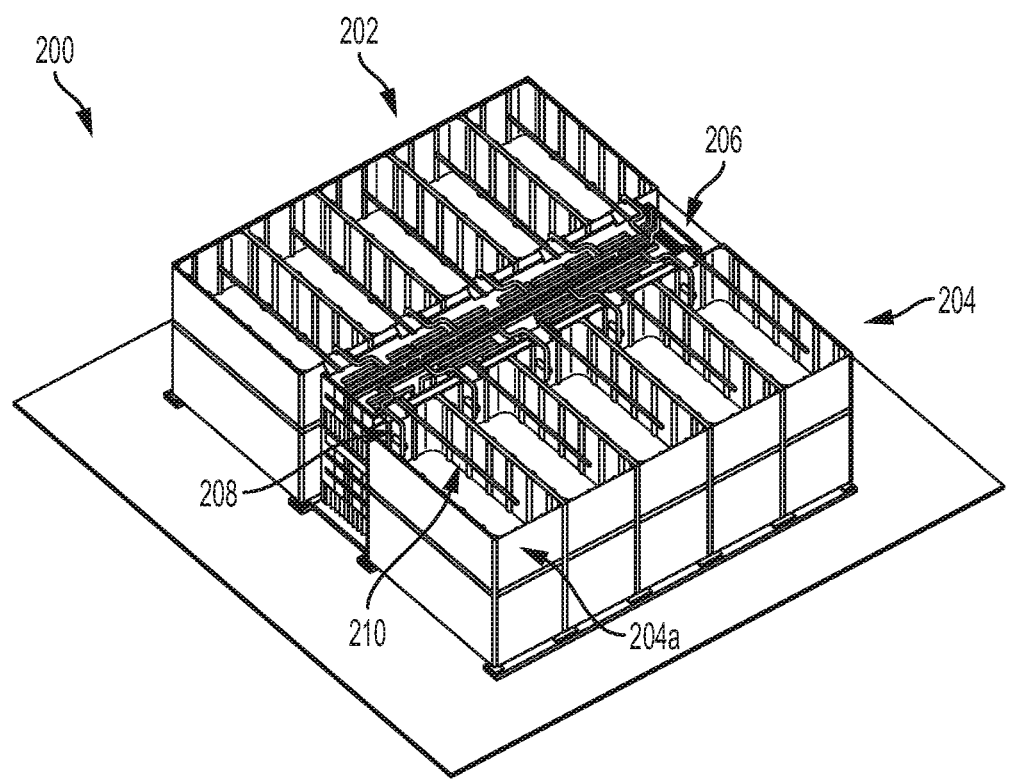
FIG. 2A is a top cutaway view of an embodiment of a modular flow battery system including a battery stack container in fluid communication with a plurality of electrolyte containers.
Figure 2B:
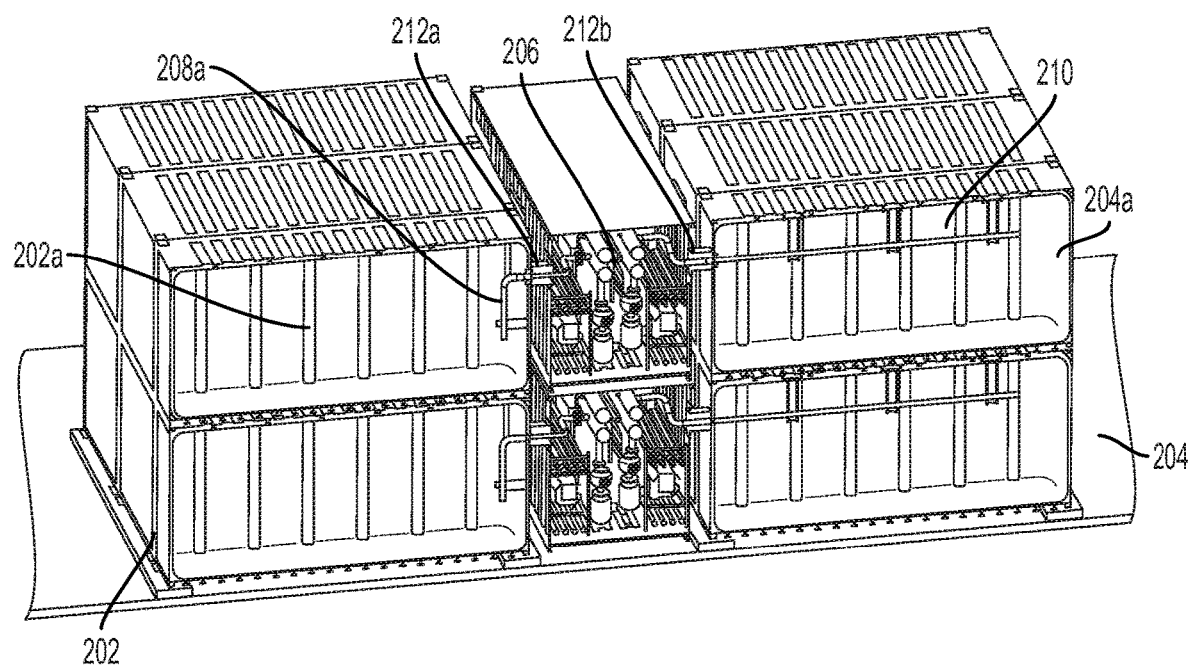
FIG. 2B is a side cutaway view of the modular flow battery system of FIG. 2A.

FIGS. 2A and 2B illustrate an example of a modular flow battery system 200 in which some embodiments can be implemented. The modular flow battery system includes first tank containers 202, second tank containers 204, and stack containers 206. The first and second tank containers 202, 204 can be, for example, anolyte and catholyte storage tank containers. The modular design takes advantage of the ability of flow batteries to separate power (provided by the stack) from energy (provided by the electrolyte). Power is determined by the number of cell stacks while energy storage capacity is determined by how much electrolyte is available for use by the cell stacks. The system provides cell stacks and electrolyte storage that are easy to transport, store, and deploy. As a result, the modular flow battery system provides large-scale energy storage capacity that can be scaled in a straightforward and cost-effective manner.

As illustrated in FIGS. 2A and 2B, the flow battery system 200 includes the plurality of battery stack containers (or stacks) 206 configured to be placed in fluid communication with anolyte storage and catholyte storage. The plurality of battery stacks 206 can be housed with any necessary electrolyte pumps, supporting plumbing, valves, and control electronics. The plumbing is configured to allow a variable number of pairs of anolyte and catholyte storage to be coupled to the plurality of battery stacks. As shown, each of the tank containers configured to carry electrolyte includes a supply pipe and a return pipe. Thus, as shown in FIG. 2A, a container 204a, illustrated as a representative of the tank containers 204 and configured to store the catholyte, includes a supply pipe 208 and a return pipe 210. FIG. 2B illustrates the return pipe 210 of the tank container 204a of the second tank containers 204, and a supply pipe 208a of an opposed tank container 202a, shown as a representative of the first tank containers 202. It should be appreciated that the supply pipe 208a of the tank container 202a and the return pipe 210 of the tank container 204a are shown as representative pipes of any of the tank containers of the described modular flow battery system in which each of the tank containers includes similar supply and return pipes (as shown in FIG. 2A).

When the flow battery system 200 is in use, each pipe is submerged in the liquid electrolyte, and the liquid electrolyte flows to and from each of the battery stack containers via the supply and return pipes, respectively. The supply pipes extending into each of the tank containers are coupled to a main electrolyte supply manifold, and return pipes extending into each of the tank containers are coupled to a main electrolyte return manifold. The main supply and return manifolds define a fluid conduit network.

Each battery stack is configured to connect to the fluid conduit network to allow flow of the anolyte and catholyte therethrough. Thus, each battery stack is configured to couple to the supply and return flows of anolyte and catholyte. With respect to the supply, an electrolyte enters the battery stack container through a plurality of supply pipe connections, each of which is coupled to the main electrolyte supply manifold. The main electrolyte supply manifold is large enough such that flow into and out of the manifold is approximately balanced. The electrolyte supply within the main electrolyte supply manifold is directed to supply electrolyte pumps (having, e.g., a 200-400 gpm flow rate), and fed through manifolds to respective battery stacks. The return electrolyte flows proceed in the reverse, through separate return portions of the fluid conduit network for each electrolyte, from the battery stacks to another set of return manifolds, return pumps, main electrolyte return manifold, and distributed to the return connections to the electrolyte containers.

In the described embodiments, manifolds that can be referred to as "shunt manifolds" can be utilized, which are configured to mitigate excessive shunt current losses between cells of the battery cells. The battery stack container houses the shunt manifolds that are configured to reduce losses associated with the shunt currents to acceptable levels. Each of the shunt manifolds serves to include an anolyte supply to an associated battery stack, a catholyte supply to an associated battery stack, an anolyte return from an associated battery stack, and a catholyte return from an associated battery stack.

Each of the plurality of battery stacks, the anolyte storage, and the catholyte storage are provided in respective containers which can have a form factor satisfying the ISO standard dimensions for shipping containers. For example, the plurality of battery stacks can be provided within ISO standard dimension 40 foot shipping containers, while the first and second electrolyte storage can be independently provided within ISO standard dimension 20 foot shipping containers. However, any ISO standard dimension shipping container sizes, or custom-designed container can be employed additionally or alternatively. The battery stack is also referred to herein as battery stack containers. The catholyte and anolyte storage can be referred to as anolyte storage containers and catholyte storage containers, respectively.

The size of the storage containers provides the ability to change power and energy storage capability of the system, which can be advantageous in the context of large-scale deployments. In one aspect, the standard dimensions of each of the battery stack containers and respective electrolyte storage containers facilitates transportation from manufacturer to site by ship, rail, and truck, as well as on-site storage and deployment, using existing infrastructure.

In a further aspect, the battery stack containers and respective electrolyte storage containers are configured for operation in a vertically stacked configuration. For example, the ISO container standard is structurally suitable for at least double stacking of each of the battery stack containers and respective electrolyte storage containers, including seismic and wind loadings. Furthermore, since each electrolyte storage container is provided in the same form factor, the plumbing of a single battery stack container can be configured for coupling with multiple pairs of electrolyte storage containers. As illustrated in FIGS. 2A and 2B, at least two layers of battery stack containers and respective electrolyte storage containers can be stacked in this manner and electrically wired in series. In particular, in the illustrated embodiment, the flow battery system 200 includes five pairs of electrolyte storage containers in each of the two layers, such that the system includes twenty electrolyte storage containers. It should be appreciated, however, that this configuration of a flow battery system is shown by way of example only.

The return and supply pipes allow fluid to be communicated between the battery stacks and the anolyte and catholyte storage. As shown in FIG. 2B, the system 200 includes pipe connections 212a, 212a that allow fluid communication of the anolyte and catholyte between the battery stack container and the electrolyte container. As shown, the pipe connection 212a is between the supply pipe 208a and cells of the battery stack container 206, and the pipe connection 212b is between the return pipe 210 and the cells of the battery stack container 206.

In the described embodiments, pipe connections are configured to couple either the return pipe or supply pipe of a catholyte-containing electrolyte container or an anolyte-containing electrolyte container. A pipe flange extends through respective sidewalls of the tank and the electrolyte housing container. On the inward facing side (the tank side), the pipe flange is secured to a terminal end of the return pipe (e.g., by a weld). On the outward facing side, the pipe flange is coupled to a containment sleeve (e.g., a double-walled structure) that extends outwards from the electrolyte container housing and encloses the pipe connections between the battery stack container and the electrolyte container. Each of the pipe flange and the containment sleeve can be formed from a material capable of withstanding chemical attack from the liquid electrolyte (e.g., HDPE).

In one embodiment, the flow battery system includes at least one battery stack container and at least one pair of electrolyte storage containers (an anolyte storage container and a catholyte storage container). However, any suitable number of pair of electrolyte storage containers can be used in a flow battery system in accordance with the described techniques.

Various components of a flow battery system can be implemented as described in the U.S. Provisional Patent Application No. 62/436,347 entitled "Modular and Scalable Flow Battery System" filed Dec. 19, 2016, the entire content of which is incorporated by reference herein. Furthermore, in some embodiments, various components of a flow battery system, including a battery cell stack, can be implemented in accordance with one or more of the following: U.S. Pat. No. 9,774,044 entitled "Flow Battery Stack With An Integrated Heat Exchanger" filed on Sep. 21, 2011, U.S. Patent Publication No. 2013/0029196 entitled "Flow Battery Cells Arranged Between An Inlet Manifold And An Outlet Manifold" filed on Jul. 29, 2011, U.S. Pat. No. 9,166,243 entitled "Flow Battery With Interdigitated Flow Field" filed on Dec. 18, 2009, U.S. Patent Publication No. 2015/0263358 entitled "Flow Battery With Mixed Flow" filed Dec. 20, 2011, and U.S. Pat. No. 8,884,578 entitled "Method And System For Operating A Flow Battery System Based On Energy Costs" filed on Feb. 7, 2011, the entire content of each of which is hereby incorporated by reference herein.

A flow battery system in accordance with the described techniques can use various types of storage containers configured to store electrolyte. In some embodiments, the storage container can include a liner member bonded on the interior or a rigid shell forming the container.

Figure 3A:
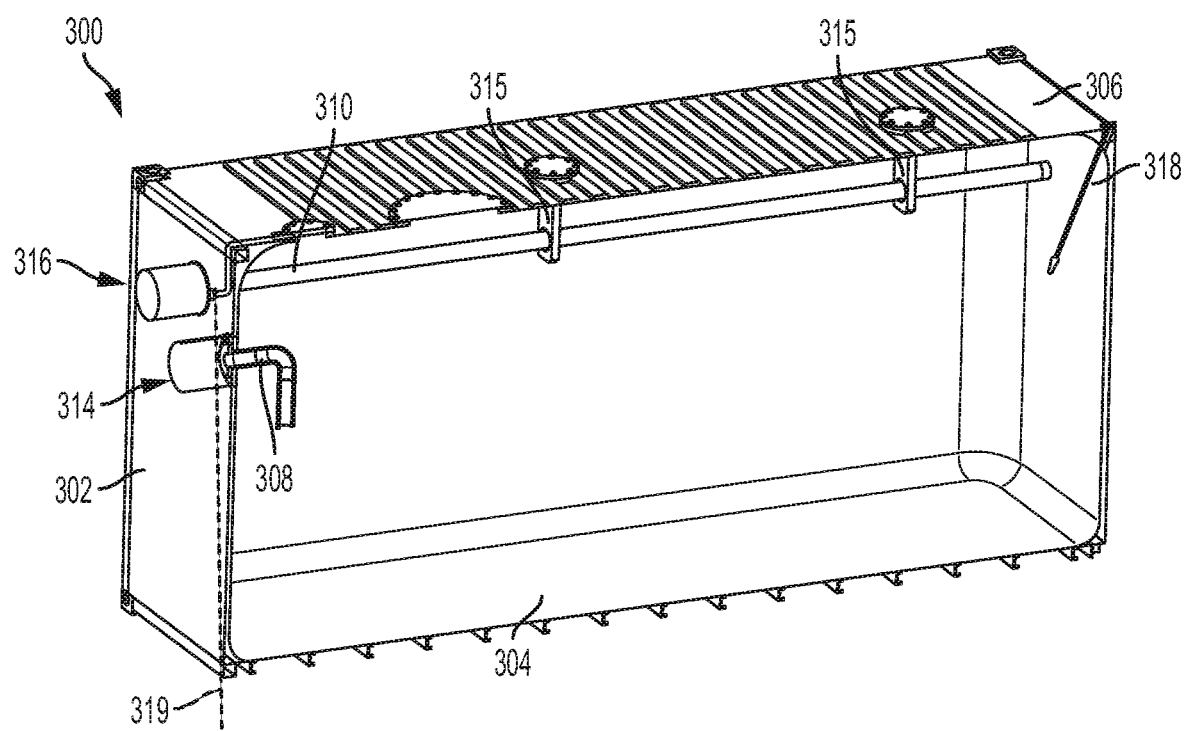
FIG. 3A is a perspective, partially cross-sectional view of an electrolyte storage container having a liner member bonded thereto, in accordance with the described techniques.

FIG. 3A illustrates one embodiment of a tank or electrolyte storage container 300 in accordance with the described techniques. The storage container 300 can be used in the flow battery system shown in FIGS. 2A and 2B, or in any other flow battery system in accordance with the described techniques. As shown in FIG. 3A, the storage container 300, shown in cross-section, includes a rigid housing or shell 302 and a liner member or liner 304. The storage container 300 also includes a cover 306 which can have any suitable features, such as, for example, manways, etc. The shell 302, which can be a standard shipment container or custom-made shipment container, includes a base and sidewalls, with the base being in some embodiments a reinforced base. The shell 302 is liquid-tight to provide secondary containment for the liquid electrolyte in the event the electrolyte escapes from the storage container. For example, in one embodiment, the shell can support a pressure of about negative 1 pounds per square inch gauge (psig) to about positive 1 psig.

In the illustrated embodiments, the shell 300 is in the form of a metal shell, which can be formed from stainless steel, aluminum, carbon steel, or any other suitable material(s). It is desirable that the metal shell have a low corrosion rate. For example, in an embodiment in which it is made from stainless steel, a corrosion allowance can be about 30 mils (thousandths of an inch), which can provide an estimated 304 days of protection.

Figure 3B:
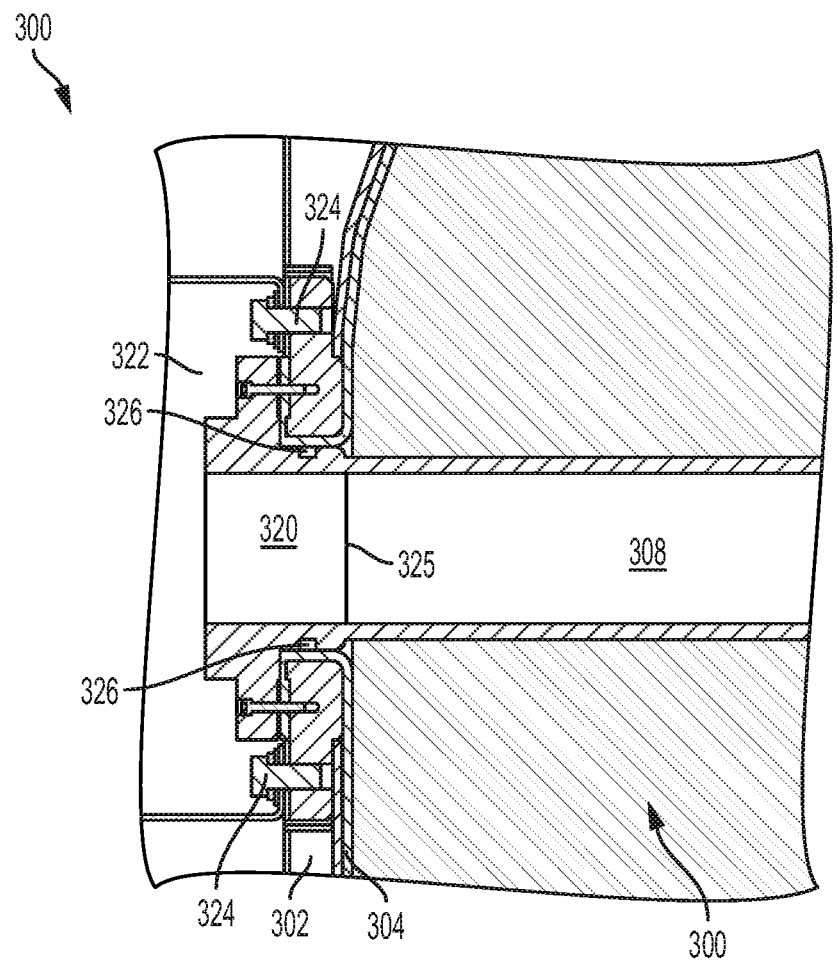
FIG. 3B is another perspective, partially cross-sectional view of the electrolyte storage container of FIG. 3A, also illustrating an example of a connection between the electrolyte storage container and a battery stack, in accordance with the described techniques.

The liner member 304 is directly bonded to inner walls of the shell 302, as schematically shown in FIG. 3B. The liner member 304 bonded to the shell 302 forms an enclosure configured to retain a liquid electrolyte, such as a catholyte or anolyte. In this way, the liner member 304 bonded to the shell 302 to become an integral part of the storage container 300, provides primary containment, with the walls of the shell 302 of the storage container 300 providing secondary containment.

The shell 302 can be in the form of a structural frame that supports and allows transporting the shell via ocean, road, or rail. The storage container 300 can be generally rectangular, though it can be square, cylindrical, oval, spherical, or trapezoidal. As mentioned above, the metal shell 302 is configured to provide secondary backup containment and can therefore contain electrolyte leaks if the liner member 304 is breached. If a breach in the liner member 304 occurs, a detection system in accordance with the described techniques is able to detect the breach and to generate an alarm transmitted to a suitable component (which can be done remotely).

The storage container 300 can have any other suitable components. For example, as shown in FIG. 3A, the storage container 300 has on one side thereof a supply sleeve 314 coupled to a supply conduit or pipe 308 (shown partially), and a return sleeve 316 coupled to a return conduit or pipe 310. The supply pipe 308 is configured to deliver electrolyte from the storage container 300 to the battery stack, whereas the return pipe 310 is configured to deliver electrolyte from the battery stack to the storage container 300. The supply and return sleeves 314, 316 are configured to enclose pipe connections between the battery stack container and the storage container 300. The liner member 304 can have openings formed thereon to provide access to the supply and return pipes 308, 310, and the openings can be formed in the liner member 304 after the liner member is bonded to the inner walls of the shell 302. The supply and return sleeves 314, 316 can be installed by a tank vendor prior to shipment of the storage container to be delivered to an installation site, or at any other time.

As shown in FIG. 3A, the storage container 300 includes return pipe supports 315 configured to provide mechanical support for the return pipe 310 during transport of the storage container. The return pipe supports 315 can also support the return pipe 313 in the flow battery system in which the storage container 300 can be utilized. Although not shown in FIG. 3A, the storage container 300 also includes supply pipe supports that provide mechanical support for the supply pipe during transport.

The storage container 300 can be constructed for either pressurized or unpressurized (vented) service. In use, a level of electrolyte in the storage container 300 can be monitored via one or more sensors. For example, when assembled and in use in a flow battery system, the storage container 300 can include a tank level sensor 318, as shown in FIG. 3A. The tank level sensor 318, which can be any suitable conductivity or other type of sensor, can be installed at an angle to allow service access even when storage is stacked on top of the storage container 300. For example, a tank level sensor as described in the U.S. Provisional Patent Application No. 62/436,347 can be employed.

FIG. 3B illustrates one embodiment of an implementation of pipe connections that allow fluid communication of the anolyte and catholyte between the battery stack container (not shown) and an electrolyte container, such as the storage container 300 in FIG. 3A. The view shown in FIG. 3B is taken at a cross-section shown with a line 319 in FIG. 3A. As shown in FIG. 3B, a pipe flange 320 extends between a sidewall 305 of the electrolyte storage container 300 and a containment sleeve 322 coupled to a fluid conduit network in the battery stack container. On the inward facing side (the storage container side), the pipe flange 320 is secured to a terminal end of the supply pipe 308 (e.g., by a weld 325). On the outward facing side, the pipe flange 320 is coupled to the containment sleeve 322 (e.g., a double-wall structure) that extends outwards from the storage container 300 and encloses the pipe connections between the battery stack container and the storage container 300. Each of the pipe flange 320 and the containment sleeve 322 can be formed from a material capable of withstanding chemical attack from the liquid electrolyte, e.g., high-density polyethylene (HDPE) or other suitable material(s).

It should be appreciated that the pipe connections for the supply pipe 308 are shown in FIG. 3B by way of example only. It should further be appreciated that the described subject matter is applicable to pipe connections that couple either the return pipe or supply pipe of a catholyte-containing container or an anolyte-containing container.

As mentioned above, the containment sleeve 322 can be coupled to the fluid conduit network of the battery stack housing at a conduit network flange. Any suitable coupling features can be used. For example, in the illustrated embodiment, a ring bolt 324 can be placed around the supply pipe 308 inside the storage container 300. Respective bolts of the ring bolt can extend through the storage container wall, the pipe flange 320, and the containment sleeve 322. Additional bolts can couple the conduit network flange to the containment sleeve. Respective seals (e.g., gaskets) can be interposed between the ring bolt and the storage container wall, between the storage container wall and the pipe flange, and between the pipe flange and the conduit network flange to inhibit electrolyte leakage. Thus, as shown in FIG. 3B, an O-ring seal 326 can also be positioned radially between the pipe flange 320 and the ring bolt 324. In one embodiment, the pipe flange can have a diameter of approximately four inches. In this manner, clearance is provided for installation and service of the pipe connection from the battery stack container, allowing close placement of the battery stack container and the electrolyte containers (e.g., less than 1 ft.).

On the battery stack side, the containment sleeve 322 can be received within a floating panel of the battery stack housing and surrounded by a seal (e.g., a gasket). A terminal end of a fluid conduit pipe of the fluid conduit network can extend through the floating panel and coupled to the conduit network flange (e.g., by a fusion weld). The fluid conduit network can further include a plurality of stress-relieving features, such as "dog-leg" connections. For example, dog-leg connections allow for thermal expansion and manufacturing tolerances. Additional details on an implementation of a connection between the electrolyte storage container and the battery stack, as well as example of implementation of the battery stack, are described in the above-mentioned U.S. Provisional Patent Application No. 62/436,347.

The storage container 300 can include various other components that facilitate its use in the flow battery. For example, the storage container 300 can have components for external gas connection(s) for controlling pressure in the container. The container 300 can utilize double seal flange fittings to reduce or eliminate leaks. Further, the storage container includes components for double-wall pipe connections, as discussed in more detail below. The storage container 300 can have any other suitable components that are not shown herein. For example, the storage container 300 can include components as described in the U.S. Provisional Patent Application No. 62/436,347.

The storage container 300 can have any suitable dimensions. For example, in one embodiment, it has a length of about 20 feet, depth or width of about 8.5 feet, and a height of about 9.5 feet. As used herein, the term "about" means plus or minus 10% of the numerical value of the number with which it is being used. Such dimensions allow transporting the container in the United States using standard transportation with a standard chassis and without an oversized permit. For example, the storage container can be a self-contained or custom-designed 20 foot ISO-dimension steel shipping container with a roto-molded polyethylene liner permanently bonded to the steel. It should be appreciated, however, that the described techniques are not limited to any specific size of the electrolyte storage container, and the container can have any other dimensions. In alternative embodiments, the dimensions of the electrolyte storage container can be varied based upon changes in industry and/or national standards for container transportation.

The liner member 304, permanently bonded to the interior of the shell 302 to form the storage container, can have any suitable dimensions. For example, in at least some embodiments, the liner member 304 has a thickness of about 0.250 inches, which provides for sufficient voltage isolation required between the electrolyte and the grounded shell 302. However, it should be appreciated that the liner member 304 can have any other suitable thickness.

The liner member 304 can be formed from any material resistant to attack by the liquid electrolyte. For example, in some embodiments, the liner member 304 can be formed from polyethylene, e.g., low-density polyethylene, medium-density polyethylene, high-density polyethylene, polypropylene, epoxy, vinyl ester, glass, etc., or a combination of any of the above materials. As an example, in some implementations, larger storage containers can be lined with medium-density polyethylene because of certain manufacturing considerations.

The liner member 304 can be attached to the shell 302 using a variety of different techniques. For example, rotomolding techniques can be used, with the mold being the shell 302 (e.g., made from steel, aluminum, or another metal). Prior to attaching the liner to the tank or shell 302, the shell can be cleaned, e.g., to remove oxides. Rotomolding can involve liquefying plastic (e.g., polyethylene or any other material used to form the liner) in a large oven inside the steel shell, and rotating the shell along multiple axes until the molten plastic coats the entire interior of the shell to a required thickness. This process can take, in some cases, about 60 minutes. The tank with the liner attached thereto will then need to be cooled down, which can take, in one embodiment, about 24 hours. The polyethylene thus becomes permanently bonded to the steel shell. Bonding of the liner 304 to the shell 302 relies on a proper preparation of a surface to which the liner 304 is to be attached and, in some embodiments, additives in the liner material.

The bond between the liner member 304 and the shell 302 of the electrolyte storage container 300 can have the strength such that differences in thermal expansion or deformation of the material (e.g., steel or other material) of the shell 302 do not cause delamination. The liner member 304 is resistant to chemical attacks. After the liner is bonded, its inner surface can be tested to verify that there are no breeches in the bonded material.

It should be appreciated that the liner member 304 can be bonded directly to the shell 302 additionally or alternatively using other suitable technologies. For example, in some embodiments, the surface of the inner walls of the shell can be treated (e.g., using spraying or other suitable technique) with a suitable polymer or glass. Thus, in some embodiments, the liner member 304 can be formed from glass, such that the interior of the shell 302 is lined with glass. During a process of lining the shell with the glass liner, in one embodiment, a desired material (e.g., enamel) can first be prepared. The shell must also be adequately prepared to create a shell of a desired configuration. Also, in some implementations, no components may be welded to the outside of a finished shell. Accordingly, provisions for attaching exterior features (e.g., pipe connections) are made before the shell is lined with glass. Once the shell is prepared, its interior and exterior can be polished (e.g., steel-grit blasted) and/or otherwise prepared for being glassed.

After the shell is made suitable for glassing, the glass is applied to the interior of the shell. For example, in one embodiment, a first coat of glass (a ground coat or "slip") is applied to the interior of the shell. The ground coat can be prepared with emulsifying agents to promote adherence to the material (e.g., steel or other material) of the shell. The ground coat may not have any corrosion resistance.

After the ground coating (e.g., in the form of a glass suspension) is applied (e.g., sprayed) onto the prepared shell, it is allowed to dry. The shell is then transported to an electric furnace where it is subjected to a certain temperature for a predetermined length of time to cause the glass to permanently adhere to the interior of the shell. The shell thus lined with the glass can then be transferred to a controlled cooling system where the shell is subjected to a lower temperature, which helps to reduce a built-in stress in the glass. Further, additional glass coatings can be applied over the ground glass coat using a similar sequence of operations, such as applying the coating, drying, applying heat thereto, and cooling it. The application of heat is done at a lower temperature than that used to apply the ground glass coat, in order to prevent the ground coat from bleeding through. Quality control spark and thickness tests can be performed between coats to ensure the quality of the finished lining. The procedure is repeated until a desired thickness of the glass liner is achieved. For example, in some embodiments, the thickness can be from approximately 1 mm to approximately 2 mm.

The described techniques of using the liner member 304 provide a number of advantages. For example, manufacturing costs can be reduced. Also, because the liner is attached directly to the metal shell (and thus there is no space therebetween), a larger area of the shell's volume is used. For example, in some implementations, usage of the liner can allow for about 11% storage volume gain. In this way, a more space-efficient storage container can be provided. At the same time, shipping costs can be the same as for a storage container for use with a different liner (e.g., not molded to the interior of the container). Also, the use of the liner allows for an increased life of the flow battery and improves electrical isolation properties of the system.

The storage container can be shipped to a location where the flow battery is to be assembled after the liner is molded thereto. Thus, in some embodiments, a certain amount of electrolyte can be placed into the storage container and the container can be shipped with the electrolyte.

The electrolyte held in a storage container of a flow battery system as described herein is highly corrosive. Because the storage container includes a liner bonded to its interior (and thus there is no void between the liner and the interior), the liner provides a primary containment for the electrolyte whereas the container itself (or the shell) provides a secondary containment. It is a requirement that a secondary containment retains electrolyte if the primary containment fails. Thus, it is required to detect a breach in a liner shortly after it contacts the metal inside the container but before the container is eroded.

A timely detection and correction of a fault in the flow battery is required for a number of reasons, such as proper operation of a system that depends on the flow battery, costs and time considerations, as well as environmental concerns. Conventionally, it may be required to temporarily pump out the electrolyte out of multiple tanks to locate a detected leak. Pumping out each tank is a complicated and time-consuming procedure (and storing the temporary removed electrolyte can be complicated) and may not be completed on time to prevent negative consequences of a leak. Thus, leaks in the flow battery need to be detected promptly and accurately.

The electrolyte stored in the storage container is electrically conductive. There is thus a conductive path from the stacks of the system to the entirety of the electrolyte. The energy storage system DC power bus is operated "floating" with respect to ground. Thus, a standard ground fault detection device may be able to detect that there is a leak in a flow battery system. However, determining in which of the tanks is that leak may be challenging. Also, when, over time, the water in the electrolyte absorbs into the liner of the tank, conventional ground fault leak detection techniques may become unable to detect the difference between this large area of electrical leakage and a specific high conductivity leak in the system.

Accordingly, the described techniques allow detecting not only an occurrence of a breach (such as a leak) in a flow battery but can also indicate in which tank (or a lined storage container) of the system the leak has occurred. Moreover, a specific area of a particular storage container in which the leak has occurred can be identified. A fault detection (which can also be referred to as a "ground fault detection") system in accordance with the described techniques can be in the form of a single detection system used for the entire flow battery. In this way, an efficient and cost-saving approach can be utilized to identify an exact location of a fault indicating a leak in the system. Appropriate measures can then be taken to fix the leak. The identification of a precise location of a leak can result in a more cost-effective way to address the leak. For example, a leak detected at a bottom of a tank can be treated as requiring more urgent attention as compared to a leak that occurred closer to the top of the tank.

The fault detection in accordance with the described techniques relies on the electrolyte in a storage container having complex impedance that is strongly distance dependent. The velocity of propagation of the electrical wave through the electrolyte can be used to determine a distance to a leak. In the described flow battery system, the metal storage containers (or tanks) are grounded. The electrical resistance from electrolyte to ground allows using two or more sensors to identify a location of a leak. The described techniques allow an identification of a location of a leak even when, over time, the water in the electrolyte absorbs into the liner of the tank. Thus, in the described techniques, the electrolyte leak is taken as a conductive path to ground that can be detected even in the presence of the overall conductivity of the water absorbed into the material (e.g., polyethylene) of the liner.

The fault detection in accordance with the described techniques is performed using two or more sensor components or sensors mounted at selected locations in the flow battery, such as along a cell stack manifold at one or both sides of the stack container, or in one or more electrolyte storage containers. Two or more sensors can be placed at any suitable locations in the flow battery where a radio frequency (RF) signal can access the electrolyte. In the described techniques, an electrolyte leak is considered to be a conductive path to ground. The sensors are used to create capacitors having a capacitive coupling to the electrolyte to give the sensing electronics RF connection to the electrolyte. The fault detection system also includes one or more sources of RF signals that transmit RF signals. The RF signals introduced into the electrolyte experience a complex reactance related to the physical configuration of the system and the lack or presence of a pinpoint high conductivity short to ground caused by a breach (leak) in the primary containment tank. Each RF source, which can be a source of high frequency alternating signals, is configured to transmit a stimulus or probe signal at a plurality of frequencies, e.g., step or sweep through a plurality of frequencies. The probe signal can be in the form of a continuous wave (CW), or it can be a stepped or swept frequency RF signal such that the RF source steps or sweeps through a plurality of frequencies. A detector (which can be part of the same device or system that includes the RF source) is configured to receive a return signal in response to the probe signal. A suitable processor is able to distinguish changes in the impedance at a sensor, indicating the presence of an anomaly which may be caused by a leak that is detected by the sensor.

The detector is configured to look for an anomaly in the form of a maximum or minimum impedance point. When there is a leak, reactance or impedance at the sensor will change. Because the frequencies of the probe signal are known, it is known at which frequency the increase or decrease (e.g., a peak) in impedance is detected. The velocity of propagation of the electrical wave through the electrolyte is also known, and it is thus possible to determine at which distance from each sensor the leak is detected. In other words, each sensor is used to determine at which distance from that sensor there is a leak. A suitable processor can then be used to determine, based on the information received using all of the sensors that each "sensed" a leak at a certain distance from it, a specific location of one or more leaks. The processor can transmit alerts indicating that a leak has occurred to an appropriate entity (e.g., service entity).

Figure 4A:
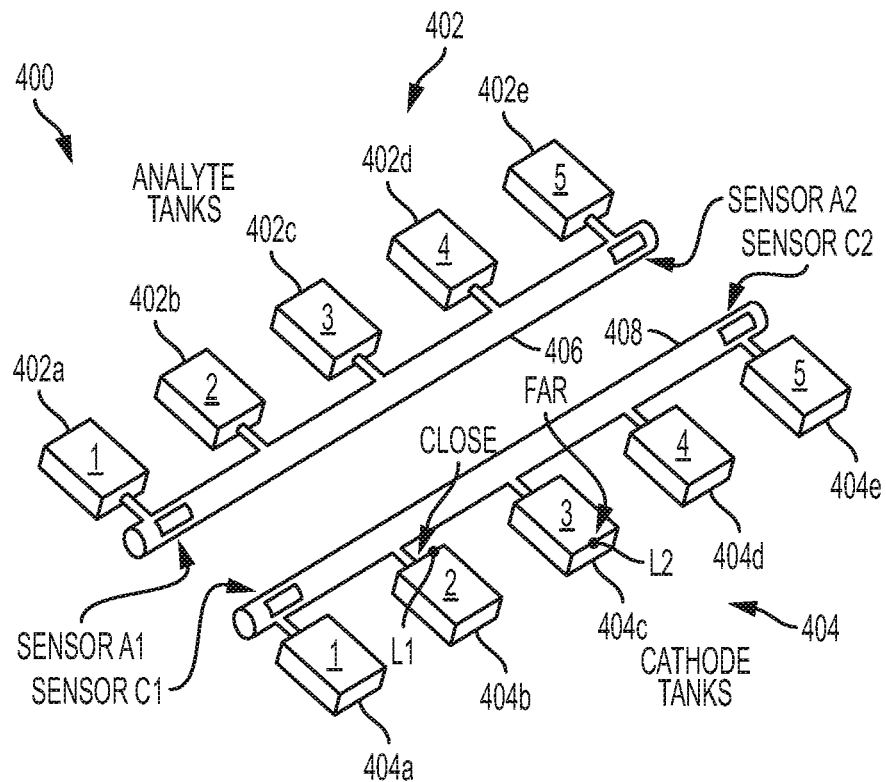
FIG. 4A is a schematic diagram illustrating a portion of a flow battery system having sensors for a fault detection system.

FIG. 4A shows an example of a flow battery 400 including anolyte storage containers or tanks 402 and catholyte storage containers or tanks 404. The anolyte and catholyte tanks 402, 404, which include respective tanks 402a-402e and 440a-404e, can be lined tanks configured as discussed above. Each of the tanks 402, 404 is coupled to the battery cell stacks that are not shown in detail in FIG. 4A for the sake of clarity, and only pipes 406, 408 (e.g., manifolds, which can include multiple pipes) coupled to the tanks 402, 404, respectively, are shown schematically. The system 400 is shown to include five anolyte tanks 402a to 402e and five catholyte tanks 404a to 404e by way of example only. It should be appreciated, however, that any number of tanks can be used in a flow battery system in accordance with the described techniques.

The flow battery 400 shown partially in FIG. 4A has a fault detection system including four sensors A1, A2, C1, C2, with other components of the fault detection system not shown. The sensors A1, A2 are placed on the pipe 406 on the side of the anolyte tanks 402, and the sensors C1, C2 are placed on the pipe 408 on the side of the catholyte tanks 404. In this example, the sensors are disposed at certain locations on the system pipes (e.g., plastic pipes), though they can be disposed at other locations, such as in any of the tanks. For example, one or more sensors can be placed in a tank. The sensors can be disposed such that all of them are disposed at different distances from the tanks, and the locations of the sensors are predetermined. In other words, a distance between each sensor and each tank is different from that for all other sensors. A number of the sensors and their locations can be selected based on the configuration of the flow battery system, e.g., the number and size(s) of storage containers, configuration of the piping system, etc. For example, three sensors can be sufficient to identify a specific location of a fault or breach using triangulation. Other factors, such as characteristics of a particular system using the flow battery, environmental considerations, etc., can also be used.

Figure 4B:
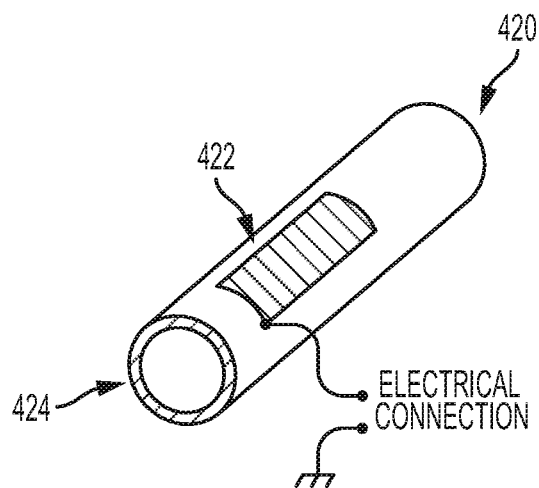
FIG. 4B is a schematic diagram illustrating an example of a sensor of the sensors of FIG. 4A.

The sensors A1, A2, C1, C2 can have any of various configurations. In some embodiments, the sensor includes a capacitor which can be made in any suitable form. For example, FIG. 4B illustrates an example of a sensor 420 having a capacitor member 422 disposed over a portion of a pipe 424 (e.g., a manifold pipe of the battery). The pipe 424 can have a diameter of, e.g., from about 8 inches to about 12 inches, though the described techniques are not limited to any specific size of the pipe. The capacitor member 422 can be formed in many different ways. For example, in the example illustrated, it can be in the form of a rectangular member made from a copper foil or other conductive material(s). The rectangular member can be self-adhesive such that it can be mounted on the pipe using its adhesive side. As another variation, a separate adhesive or another attachment feature can be used to non-removably or removably position the capacitor member 422 on the pipe 424. The size of the capacitor member 422 can depend on a thickness of a wall of the pipe 242; in some embodiments, the size can be from about 50 square inches to about 150 square inches. However, the capacitor member 422 can have other thickness, as the embodiments are not limited in this respect.

As mentioned above, a conductive path exists from the cell stacks of the flow battery system to the entirety of the electrolyte. The capacitor member 422 and the electrolyte are electrical conductors that are separated by a dielectric. The capacitor member 422 in combination with the electrolyte and dielectric form capacitive coupling between the capacitor member 422 and the pipe 424 on which the capacitor member 422 is formed. Thus, each sensor (e.g., the sensors A1, A2, C1, C2 of FIG. 4A) in effect creates a coupling point, and, in some embodiments, complex impedance can be detected at each coupling point, as discussed below.

Each sensor (the location of which is known) is used to determine a distance between that sensor and a fault in the flow battery system. Referring to FIG. 4A, the four sensors A1, A2, C1, C2 can provide redundancy and improved accuracy as well as the ability to differentiate between potentially ambiguous leak locations. This alleviates a potential decrease in the resolution of the fault detection with distance due to resistance leakage through tank walls to ground. For example, as shown in FIG. 4A, there is a leak L1 in the tank 404b ("tank 2"), that (the leak) is close to the main pipe 408 and a leak L2 in the tank 404c ("tank 3") that (the leak) is further away from the main pipe 408. The leaks L1 and L2 can be at the same distance from the sensor C2. The described fault detection system is able to differentiate between the leaks L1 and L2 and to thus identify their respective locations.

Figure 5:
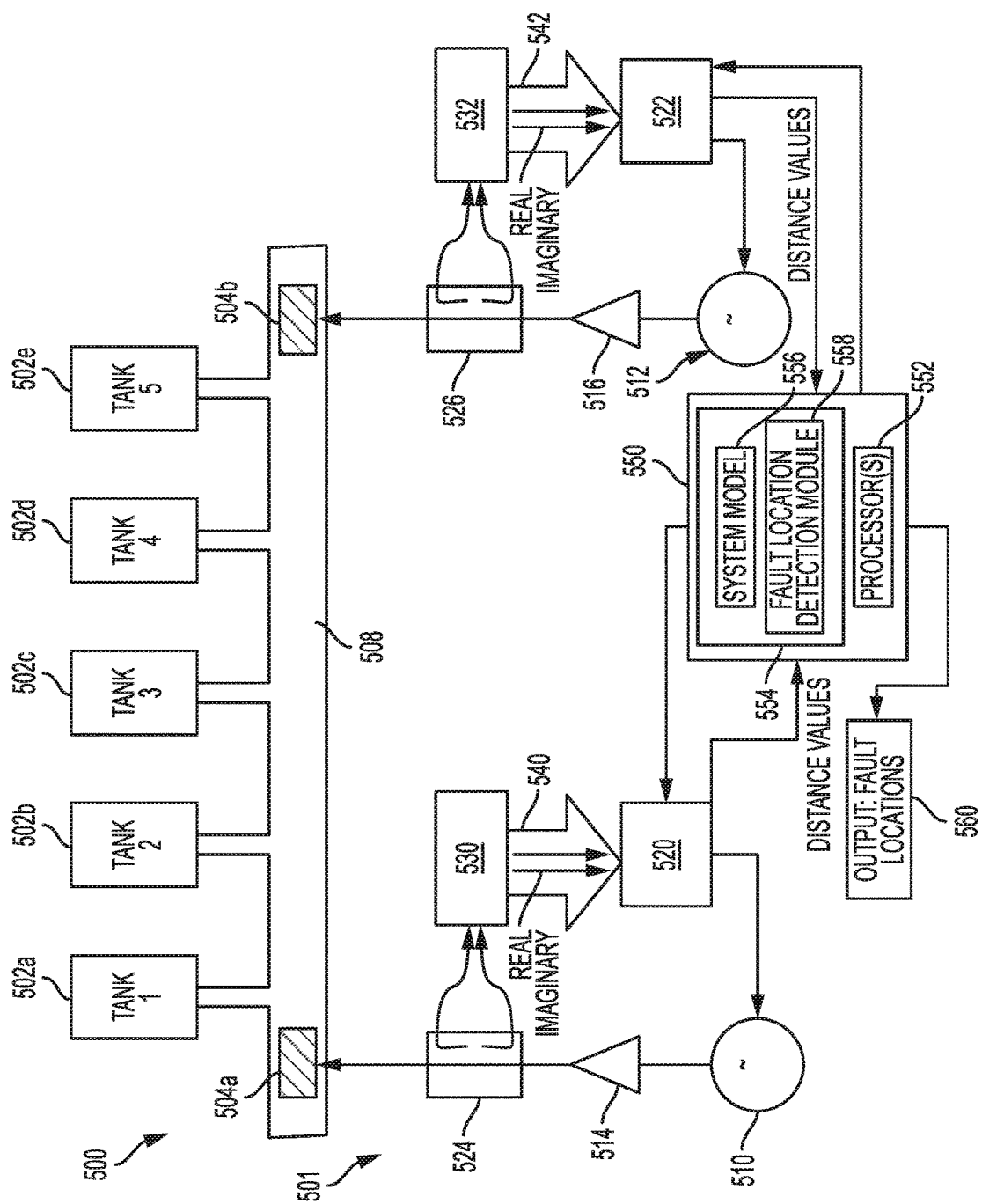
FIG. 5 is a schematic diagram illustrating a portion of a flow battery system having a fault detection system.

FIG. 5 illustrates a more detailed example of a flow battery system 500 having a fault detection system 501 in accordance with the described techniques. In this example, five tanks 502a, 502b, 502c, 502d, 502e are show by way of example only, which can be anolyte or catholyte tanks. It should be appreciated that the other tanks (e.g., catholyte or anolyte) are not shown for the sake of simplicity. In this example, the fault detection system includes first and second sensors 504, 506 disposed at certain locations at the cell stacks. For example, as shown, the sensors can be placed on the opposite sides of a manifold 508. As shown in FIG. 4B, each of the first and second sensors 504, 506 can be in the form of a capacitor configured in any suitable manner, though the sensors can have other configurations. Each sensor creates a capacitive coupling between a conductor component of the sensor and the internal conductive electrolyte, with the plastic pipe on which the sensor's conductor is placed acting as a dielectric. In this way, if there is a leak in a tank, reactive impedance at the sensor will show characteristic peaks or dips at specific frequencies directly related to the distance to the leak.

As shown in FIG. 5, the fault detection system also includes at least one RF source which is, in this example, in the form of two RF sources 510, 512. It should be appreciated that the described techniques are not limited to RF signals, as other types of signals can be used additionally or alternatively and other signal sources can be used respectively. Each of the RF sources is configured to transmit at least one probe signal at a plurality of frequencies. The frequencies can be selected based on a property of electrolyte and other factors. The probe signal can be amplified using an RF amplifier (e.g., a high frequency RF amplifier), such as an RF amplifier 514 and an RF amplifier 516. In the example illustrated in FIG. 5, processors ("CPU") 520, 522 control respective RF sources 510, 512. However, as a person skilled in the art will appreciate, the RF sources can be controlled using any other devices. In some embodiments, the RF sources may have a characteristic source impedance and reactive matching network to match system characteristics, which may include the technique of "conjugate match." Furthermore, in some embodiments, a "fast-edge" pulse generator can be used, in which case digital signal processing (DSP) technology can be utilized. Any other suitable pulse generator can be used alternatively.

As shown in FIG. 5, in the illustrated implementation, the fault detection system can include a directional bridge circuit (e.g., an RF coupler), in the form of a directional bridge 524 and a directional bridge 526, which can be of the same or different type. A probe signal transmitted by each RF source travels thorough the respective directional bridge towards the sensors. Thus, a probe signal transmitted by the RF source 510 is amplified by the amplifier 514 and travels thorough the directional bridge 524 towards the sensor 504. Similarly, a probe signal transmitted by the RF source 512 is amplified by the amplifier 516 and travels thorough the directional bridge 526 towards the sensor 506. The directional bridge is then used to measure the amplitude and phase of the impedance based on the return signal. It should be appreciated that the fault detection system can additionally or alternatively include any other components. For example, in some embodiments, the fault detection system can alternatively include a Wheatstone bridge circuit, a Kelvin bridge circuit, another suitable bridge circuit, or different component(s).

After the probe signal is transmitted, a reflected signal in the form of a return signal is detected by a detector, such as detectors 530, 532 shown in FIG. 5. If there is a leak in the flow battery system, a value of at least one characteristic of the return signal will be different from an expected value of that property that is expected to be detected when the system does not have a leak. Each of the detectors 530, 532 can be any suitable device having an RF receiver component and at least one microprocessor or digital signal processor (DSP). In this example, the detector can be placed at each end of the manifold. The flow battery system in this example can thus have four detectors. As noted above, the other half of the flow battery system, and thus the other two sensors and two detectors, are not shown in FIG. 5. It should be appreciated, however, that fewer than four detectors can be used in a flow battery system. For example, in some implementations, a single detector can be utilized. As another example, in other implementations (e.g., when the system is large), a detector can be associated with each tank, or other number of detectors can be used.

Regardless of its specific configuration and location, the detector (e.g., any of the detectors 530,532) determines a value of at least one characteristic of the return signal. For example, in the illustrated embodiments, the detector determines the frequency at which an anomaly is present. This is accomplished by processing the return signal. In particular, the detector can compute the complex impedance at each sensor location from the return signal(s). If an anomaly is present, a leak will be declared by the detector if the computed impedance at different frequencies shows the characteristic of a "shorted stub" at a particular frequency in the range of frequencies used. The computed wavelength is then converted to distance with the known velocity of propagation of the wavefront to indicate the presence of a leak, its distance, and a fault alarm will may be triggered. The distance to the detected leak is compensated to adjust for different velocities of propagation due to geometry characteristics of the flow battery system. Thus, when there is a no leak, no peak or dip, or reactive impedance crossing through zero is computed by the detector. A change at a certain frequency (e.g., ¼ wavelength) leads to an increase (e.g., a peak or dip) in the reactance or reactive impedance that is the imaginary part of the complex impedance. Suitable techniques can be used to visualize the complex impedance. For example, a Smith chart can be used, where the resistance is the real part of the impedance (the x-axis) and the reactance is the imaginary part of the impedance (the y-axis).

Thus, in the example illustrated in FIG. 5, each of the detectors 530, 532 is schematically shown to provide a respective result 540, 542 of the processing of the return signal as a complex number having real and imaginary parts of the complex impedance, which indicate resistance (real component) and a magnitude of reactance (imaginary part). As mentioned above, a Smith chart can be used to visualize and analyze the complex impedance. The result is provided to the processors ("CPU") 520, 522 configured to compute a distance value indicating a distance of a leak from each sensor. The velocity of propagation of the electrical wave through the electrolyte is known and close to the speed of light, and slows down in the tanks which electrically resemble a transmission line. This difference is modelled and built into the geometry processor algorithm to more accurately pinpoint the leak location. Thus, because the sensors can be located at different distances from the tanks, each change (e.g., a peak or dip) in impedance can be unique. Each distance value can be computed since the frequency at which the change in impedance is detected is known.

The ground fault detection in accordance with the described techniques relies on the electrolyte in a storage container having low impedance. The velocity of propagation of the electrical wave through the electrolyte can be used to determine a distance to a leak using the correction factor mentioned above for enhanced accuracy.

As shown in FIG. 5, the distance values can be provided to a computing device 550 having computer hardware 552 that includes at least one processor which can compute a location of each fault based on the distance values. The computing device 550 can be any suitable computing device. Memory hardware 554 of the computing device 550 can store, in the form of computer-executable instructions, a system model 556 of the components of the flow battery including velocity of propagation factors corresponding to the battery system component mechanical configuration. The system model 556 can include representations of a configuration of the flow battery system and all of the system's components, including the storage containers, piping, as well as a position of each sensor and each detector of the fault detection system. A fault location detection module 558 of the computing device 550 is configured to receive, using the processor(s), information transmitted by the processors 520, 522 and execute the processor(s) to analyze the information. The information includes a distance to a leak from each of the sensors. The processing involves accessing the system model 556 stored in the memory hardware of the computing device 550, and, based on the processing results, determining a location of each leak. As shown schematically in FIG. 5, the fault locations can be provided as output 560, which can be provided to a suitable entity (e.g., in the form of alerts), such as to a service operator or to any other entity that can use this information to address the leak.

The computing device 550 can be located at any suitable location. For example, it can be part of flow battery system processors. Alternatively, it can be a remote computing device located at a service center, engineering facility, or at any other location.

It should be appreciated that the components of the fault detection system 501 are shown in FIG. 5 separately by way of example only. In particular, any of the RF sources and amplifiers, detectors, processors, etc. can be included in one or more of different devices or systems. For example, the processors 520, 522 configured to compute the distance values and the computing device 550 determining fault locations are shown as separate components by way of example only, as they can be included in the same computing device(s). For example, the same computing device(s) can compute the distance values and to determine a fault location based on the distance values. Furthermore, in some implementations, the detectors 530, 532 can also be included in the same device(s) encompassing the processors 520, 522 and the computing device 550. One or more of the RF sources can also be included in the same device or system including any of the other components shown in FIG. 5.

In the described embodiments, each RF source of a device transmitting other types of stimulus or probe signals (e.g., a suitable pulse generator), is configured to transmit signals of at least one predetermined frequency. In the illustrated embodiments, the RF source can step or sweep through a plurality of frequencies which can be, in some implementations, in a range of from about 5 MHz to about 50 MHz, which can be used for a detection range of from about 3 feet to about 30 feet. The frequency can be adjusted based on desired detection ranges. A number of the RF sources and their locations can be selected based on the characteristics of the system, such as, e.g. a number and dimensions of storage containers, desired detection ranges, etc. Alternatively, a wideband RF noise source may be employed with DSP detection techniques to calculate similar real and reactive system response. Furthermore, as mentioned above, in some embodiments, a "fast-edge" pulse generator can be used, in which case digital signal processor (DSP) technology can be utilized.

Figure 6:
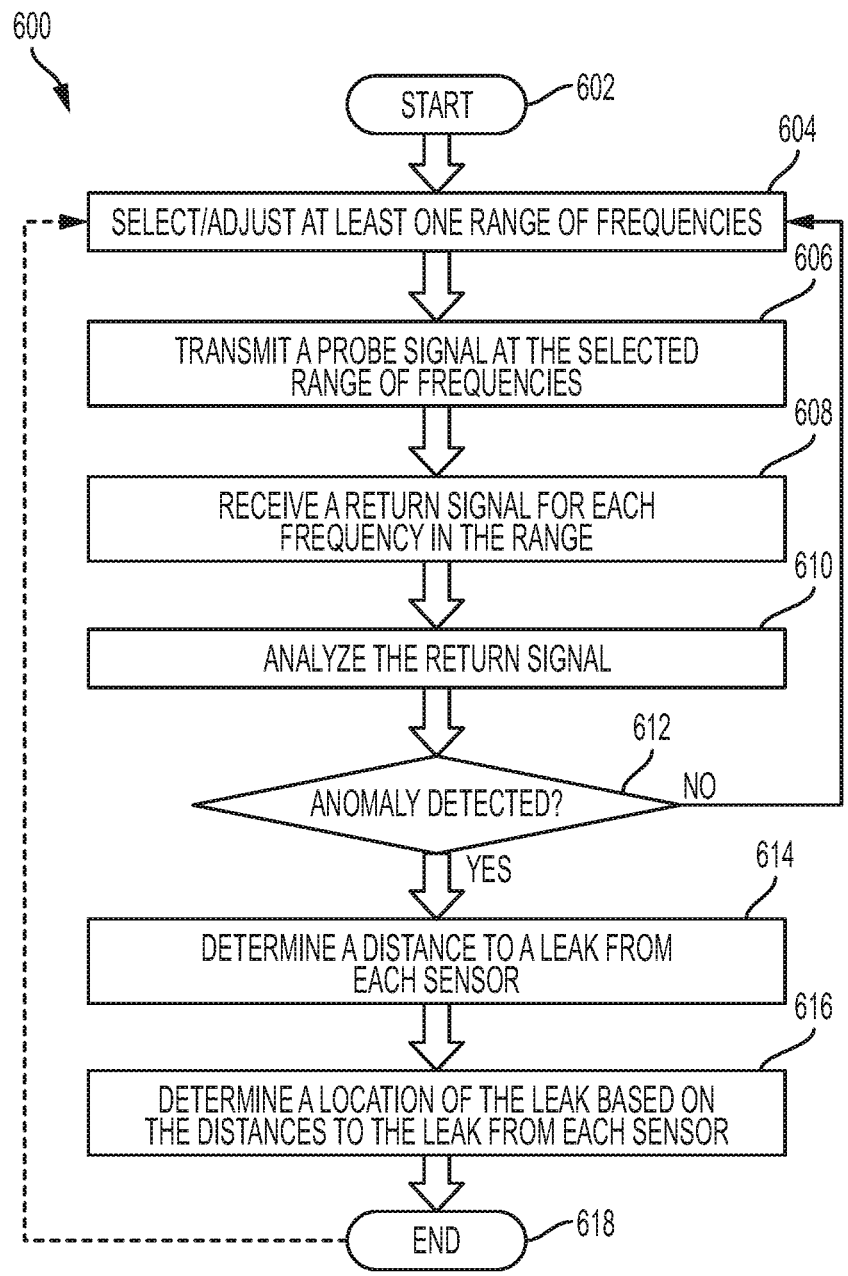
FIG. 6 is a flowchart illustrating a process of operating a flow battery system, in accordance with the described techniques.

FIG. 6 illustrates an embodiment of a process 600 of operating the fault detection system in accordance with the described techniques. The process 600 can be performed by two or more components of the fault detection system, such as, e.g., fault detection system 501 (FIG. 5). The process 600 can start at block 602, e.g., when the fault detection system is activated. It should be appreciated that the fault detection system can operate continuously when the flow battery is operating. At block 604, at least one frequency can be selected for a probe or stimulus signal to be transmitted by the detector. The at least one frequency can be a frequency range. The frequency range can be selected in a number of different ways. The information on the frequency range can be received from a central computer (e.g., the computing device 550 in FIG. 5), or the processor of communicating with or included in each detector (e.g., detectors 530, 532 in FIG. 5) can select the frequency range. Values of the selected frequency range can be adjusted values of previously used frequency range(s). Once an anomaly (leak) is detected, the frequency range can be temporarily adjusted to a narrow range to improve range resolution. For example, if a potential leak is detected at 20 MHz, the frequency step range could be adjusted to cover 19.5 to 20.5 MHz, which could give improved resolution due to smaller steps or slower sweep speed.

At block 606, a probe signal having at least one selected frequency can be generated and transmitted by a suitable signal source. The probe signal can be, for example, an RF signal transmitted by an RF source. At block 608, a return signal for the at least one selected frequency can be received, as a result of transmitting the probe signal through an open circuit created between the signal source and each of the sensors. At block 610, the return signal is analyzed. For example, with reference to FIG. 5, the detectors 530, 532 and the processors 520, 522 can be used to analyze the return signal(s). As discussed above, the properties of the return signal change when there is a leak in the system, due to a change in reactance or impedance at the sensors. Because the frequencies of the probe signal are known, it is known at which frequency the increase or decrease (e.g., a peak) in impedance is detected. At decision block 612, it is determined, based on the analysis of the return signal, whether an anomaly indicating a leak is detected in the return signal. If it is determined that an anomaly indicating a leak is detected in the return signal, a distance to the leak from each sensor can be determined, at block 614. For example, with reference to the fault detection system 501 (FIG. 5), the processors 520, 522 can determine the distance values and provide them to the computing device 550. As mentioned above, in some embodiments, the processors 520, 522 can be part of the computing device 550. The determined distance values are then used, at block 616, to determine a location of the leak. The process 600 can then end, at block 618. However, as mentioned above, the process 600 can be a continuous process such that, after the leak is detected and its specific location in the battery system is determined, the process 600 can return to block 604, as shown schematically (by a dashed line) in FIG. 6.

If the analysis of the return signal does not indicate the leak is detected, the process 600 can return to block 604 where the frequency can be selected. It should be appreciated that the same frequency can be used to again transmit the probe signal at block 606. Also, in some cases, when a point indicative of a possible leak is detected, as discussed in an example below, the probe signal at an appropriately adjusted frequency can be transmitted to perform additional processing which can be used to confirm a presence of a leak in a storage container.

As mentioned above, the fault detection system can operate continuously. One or more signal sources (e.g., RF source) can repeatedly sweep across a selected frequency range while the detector(s) monitor the return signal for an indication of a leak. In some embodiments, the range of RF frequencies can be from about 5 MHz to 50 about MHz, which can be used for a detection range of from about 3 feet to about 30 feet. The frequency can be adjusted based on a desired detection range. The frequency ranges can be selected such that, when multiple signal sources (which can be included in the same device(s) that include the detector(s)) are in operation on the same electrolyte system, their sweeps across one or more frequency ranges do not interfere with each other. For example, the frequency ranges can be selected randomly (within a certain range or not), and can be averaged to eliminate interference. As another option, the frequencies at which the signal sources operate can be synchronized and offset in such a manner that each detector's receiver bandwidth makes other detectors' signals invisible to one another and therefore not interfering. Furthermore, in some implementations, suitable tunable receivers are utilized, such as, e.g., a varactor-tuned filter, or any other tunable receiver.

In some embodiments, the frequency of a probe signal transmitted by an RF source is a controlled sweep between two values, "low" and "high" frequencies. The low frequency can be selected based on the furthest point in the flow battery system that needs to be detected, and that is the quarter-wavelength based on the velocity of propagation. Assuming for the sake of simplicity that a velocity of propagation of a signal emitted by the RF source is 1.0, a 5 MHz frequency would have a wavelength of 60 meters, while a quarter-wavelength would be 15 meters or about 45 feet. The high frequency determines the closest point of failure which can be detected. Thus, assuming for the sake of simplicity that the frequency is 50 MHz, the wavelength would be 6 meters, and quarter wavelength would be 1.5 meters or about 4.5 feet.

The fault detection system can analyze the return signal, for example, at block 610 (FIG. 6) using a number of various techniques. The information acquired by a detector (the return signal) can be phase and magnitude sensing, such as, e.g., scattering parameter. In some embodiments, the information can include a scattering parameter $S_{11}$. For example, the system (e.g., the detector or any other component) can monitor the output of the detection bridge configured to detect the S parameter $S_{11}$. For example, the detector can monitor a detection bridge configured to detect the S parameter $S_{11}$. During each sweep across a frequency range, the detector's processor can search for a point where the imaginary output from the detection bridge goes from positive (inductive) to negative (capacitive). The point where it crosses zero is the quarter-wavelength to the detected leak. When this point is detected, the sweep can be repeated at frequencies close to the frequency of interest to improve resolution, and a number of sweeps can be performed. In some implementations, averages can be used to reduce measurement noise.

In some embodiments, a two-probe system can be used, such that the scattering parameter $S_{12}$ can be used. The fault detection can be used for automatic determination of the drive impedance as well as optimum frequency or a frequency range to use for excitation for the best detection probability. Mathematical analysis of the scattering parameters can be used to identify a resistance to ground which is out of scale with the distributed capacitance present across the entire storage container surface. Mathematical conversion into the time domain can help identify a distance from the sensing probe to the fault and more than one sensor can enable triangulation to the location of this fault.

It should be appreciated that a fault in a flow battery system using storage containers with liners as described herein can be detected using other suitable approaches. For example, in one embodiment, a Tektronix Time Domain Reflectometer (TDR), an instrument which sends a pulse with a sharp rise time into a transmission line and plots the return, can be used. If it is a "perfect" transmission line, the pulse essentially disappears. Any anomalies result in a reflection back to the instrument of some of the energy of the pulse. If the velocity of propagation of the transmission line is known (which is typically the case, as this information is available from the instrument's manufacturer), it can be possible to determine the distance to the anomaly (e.g., a fault).

It should be appreciated that any other techniques can be used to detect a fault and to identify its location in a flow battery system. Regardless of the utilized approach, a specific location of a fault or leak can be identified, which can include a specific location within a tank, which allows for prompt appropriate measures to be taken to repair the leak.

One skilled in the art will appreciate further features and advantages of the disclosed systems and methods based on the above-described embodiments. Accordingly, the present disclosure is not to be limited by what has been particularly shown and described, except as indicated by the appended claims. All publications and references cited herein are expressly incorporated herein by reference in their entirety.

What is claimed is:

1. A flow battery system comprising:
   at least one cell stack;
   at least a pair of storage containers connected to the at least one cell stack, each of the storage containers having:
      a rigid shell;
      a liner member directly bonded to at least a portion of inner walls of the rigid shell and forming an enclosure configured to retain a liquid electrolyte; and
   a fault detection system configured to detect a fault in at least one of the storage containers, wherein the fault detection system includes:
      a plurality of sensors disposed at selected locations in the flow battery system;
      at least one radiofrequency signal source configured to transmit a plurality of radiofrequency probe signals at a selected frequency range through the flow battery system;
      at least one detector configured to receive at least one radiofrequency return signal received in response to transmitting the plurality of radiofrequency probe signals, the at least one radiofrequency return signal including a complex impedance;
      at least one processor configured to:
         analyze the return signal received by the at least one detector to determine a frequency at which a peak in complex impedance occurs;
         generate distance values indicating a distance from each of the plurality of sensors to the leak based upon the determined frequency and a velocity of propagation of the radiofrequency probe signals and at least one radiofrequency return signal within the liquid electrolyte; and
         output a location of the leak in the flow battery system based on the generated distance values.

2. The flow battery system of claim 1, wherein the fault detection system is configured to detect a location of the detected fault.

3. The flow battery system of claim 1, wherein the fault comprises at least one leak of the liquid electrolyte through the liner member.

4. The flow battery system of claim 1, wherein the liner member is roto-molded to the inner walls of the rigid shell.

5. The flow battery system of claim 1, wherein the electrolyte comprises an anolyte or a catholyte.

6. The flow battery system of claim 1, wherein the rigid shell is formed from a metal.

7. The flow battery system of claim 6, wherein the metal comprises steel.

8. The flow battery system of claim 6, wherein the metal comprises aluminum.

9. The flow battery system of claim 7, wherein the steel comprises stainless steel or carbon steel.

10. The flow battery system of claim 1, wherein the flow battery comprises a vanadium redox flow battery.

11. The flow battery system of claim 1, wherein the liner member is formed from at least one material selected from a high-density polyethylene, a medium-density polyethylene, a low-density polyethylene, polypropylene, epoxy, vinyl ester, and glass.

12. The flow battery system of claim 1, wherein each of the sensors forms a capacitive coupling between the sensor and the entirety of the electrolyte in the flow battery.

13. The flow battery system of claim 1, wherein the detector and the processor are included in the same device.

14. The flow battery system of claim 1, wherein the processor is configured to provide an alert indicating an occurrence of the leak at the determined location.

15. A method of operating a flow battery system, comprising:
    causing at least one radiofrequency signal source to transmit a plurality of radiofrequency probe signals at a frequency range through the flow battery system comprising a plurality of sensors disposed at selected locations in the flow battery;
    receiving at least one radiofrequency return signal generated in response to transmitting the plurality of radiofrequency probe signals, wherein the at least one radiofrequency return signal includes a complex impedance;
    analyzing the return signal to determine a frequency at which a peak in complex impedance occurs;
    determining distance values indicating a distance from each of the sensors to the leak based upon the determined frequency and a velocity of propagation of the radiofrequency probe signals and at least one radiofrequency return signal within the liquid electrolyte; and
    outputting a location of the leak in the flow battery system based on the determined distance values.

16. The flow battery system of claim 1, wherein the at least one return signal received by the detector comprises complex impedance.

17. The flow battery system of claim 16, wherein the complex impedance comprises resistance as a real part and reactance as an imaginary part.

18. The flow battery system of claim 17, wherein a peak or dip in the reactance is indicative of the leak.

* * * * *